US010181982B2

(12) United States Patent
Tapia et al.

(10) Patent No.: US 10,181,982 B2
(45) Date of Patent: Jan. 15, 2019

(54) DISTRIBUTED MULTI-DATA SOURCE PERFORMANCE MANAGEMENT

(71) Applicant: TUPL, Inc., Snoqualmie, WA (US)

(72) Inventors: Pablo Tapia, Snoqualmie, WA (US); Rafael Guerrero, Snoqualmie, WA (US)

(73) Assignee: TUPL, INC., Bellevue, WA (US)

( * ) Notice: Subject to any disclaimer, the term of this patent is extended or adjusted under 35 U.S.C. 154(b) by 190 days.

(21) Appl. No.: 15/019,947

(22) Filed: Feb. 9, 2016

(65) Prior Publication Data

US 2016/0248624 A1   Aug. 25, 2016

Related U.S. Application Data

(60) Provisional application No. 62/113,992, filed on Feb. 9, 2015.

(51) Int. Cl.
*H04L 12/24* (2006.01)
*H04L 12/26* (2006.01)
*G06F 15/16* (2006.01)

(52) U.S. Cl.
CPC .......... *H04L 41/5009* (2013.01); *H04L 43/04* (2013.01); *H04L 43/065* (2013.01); *H04L 43/08* (2013.01)

(58) Field of Classification Search
CPC ... H04L 41/5009; H04L 43/04; H04L 43/065; H04L 43/08; H04L 12/24; H04L 12/26
See application file for complete search history.

(56) References Cited

U.S. PATENT DOCUMENTS

| | | | | |
|---|---|---|---|---|
| 6,965,886 | B2 * | 11/2005 | Govrin | G06F 17/30592 706/45 |
| 7,313,533 | B2 * | 12/2007 | Chang | G06Q 10/063 705/7.38 |
| 7,933,791 | B2 * | 4/2011 | Nelmes | G06Q 10/06 705/7.11 |
| 8,311,863 | B1 * | 11/2012 | Kemp | G06Q 10/0639 705/7.11 |
| 8,767,019 | B2 * | 7/2014 | Heinrich | G06Q 10/06393 345/173 |
| 9,432,865 | B1 * | 8/2016 | Jadunandan | H04W 24/08 |
| 9,760,240 | B2 * | 9/2017 | Maheshwari | G06F 17/30548 |

(Continued)

*Primary Examiner* — Moustafa M Meky
*Assistant Examiner* — Thorne E Waugh

(57) ABSTRACT

A performance management engine may be implemented to continuously detecting entity performance issues. The performance management engine may calculate one or more key performance indicators (KPIs) that measure performance of an entity. The performance management engine may further receive one or more additional sources of data regarding the entity via a data management platform that interfaces with multiple data sources. The performance management engine may aggregate the KPIs and the one or more additional sources of data into datasets according to one or more grouping parameters. The data in one or more datasets may be analyzed by the performance management engine to generate one or more comprehensive performance indicators. The comprehensive performance indicators are then provided for display on a user device. Each KPI or comprehensive performance indicator measures performance of a device, a component, a node, or a service of the entity.

20 Claims, 8 Drawing Sheets

(56) References Cited

U.S. PATENT DOCUMENTS

| | | | |
|---|---|---|---|
| 2006/0184414 A1* | 8/2006 | Pappas | G06Q 10/06 705/7.14 |
| 2009/0006148 A1* | 1/2009 | Bacalski | G06Q 10/063 705/7.11 |
| 2009/0216881 A1* | 8/2009 | Lovy | H04L 41/0233 709/224 |
| 2010/0325267 A1* | 12/2010 | Mishra | H04L 41/069 709/224 |
| 2012/0059923 A1* | 3/2012 | Cleary | H04L 41/0233 709/223 |
| 2013/0246131 A1* | 9/2013 | Olsen | G06Q 10/0637 705/7.36 |
| 2014/0068034 A1* | 3/2014 | Tapia | H04L 41/082 709/221 |
| 2014/0172514 A1* | 6/2014 | Schumann | G06Q 10/06393 705/7.39 |
| 2015/0023188 A1* | 1/2015 | Das | H04W 24/10 370/252 |
| 2015/0095119 A1* | 4/2015 | Hariharan | G06Q 10/06393 705/7.39 |
| 2017/0032016 A1* | 2/2017 | Zinner | G06Q 10/063 |

* cited by examiner

DISTRIBUTED MULTI-DATA SOURCE PERFORMANCE MANAGEMENT

CROSS REFERENCE TO RELATED PATENT APPLICATION

This application claims priority to U.S. Provisional Patent Application No. 62/113,992, filed on Feb. 9, 2015, entitled "Unified Data Management System," which is hereby incorporated by reference in its entirety.

BACKGROUND

Performance management tools are software applications that evaluate the performances of entities to ensure that operational goals are being met in an efficient manner. In some examples, the entities may include networks, such as a wireless carrier network that delivers mobile communication services to end users. In other examples, the entities may include systems, such as a utility system that delivers a utility service to commercial and residential customers. Performance management tools may be used to detect and diagnose entity performance problems so that an expected level of service is maintained. A performance management tool may monitor multiple sets of performance metrics, such as end user metrics and resource metrics. End user metrics may measure the performances experienced by end users of an entity. Resource metrics may measure computational or other resources used by an entity under a work load, in order to identify resource inadequacies and performance bottlenecks. Accordingly, performance management tools may generate key performance indicators (KPIs) based on the monitored performance metrics.

However, conventional performance management tools are designed to generate KPIs upon end user request rather than in a continuous manner. As a result, the generation of critical KPIs may take anywhere from several minutes to many hours. These time lags may hinder the ability of a requesting party to respond in a timely manner to performance problems that affect mission critical entity components and services. Such loss of time in responding to performance problems may result in an inability to provide a guaranteed level of service or a guaranteed level of user experience, which may result in a loss of revenue, customer base, and business reputation.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
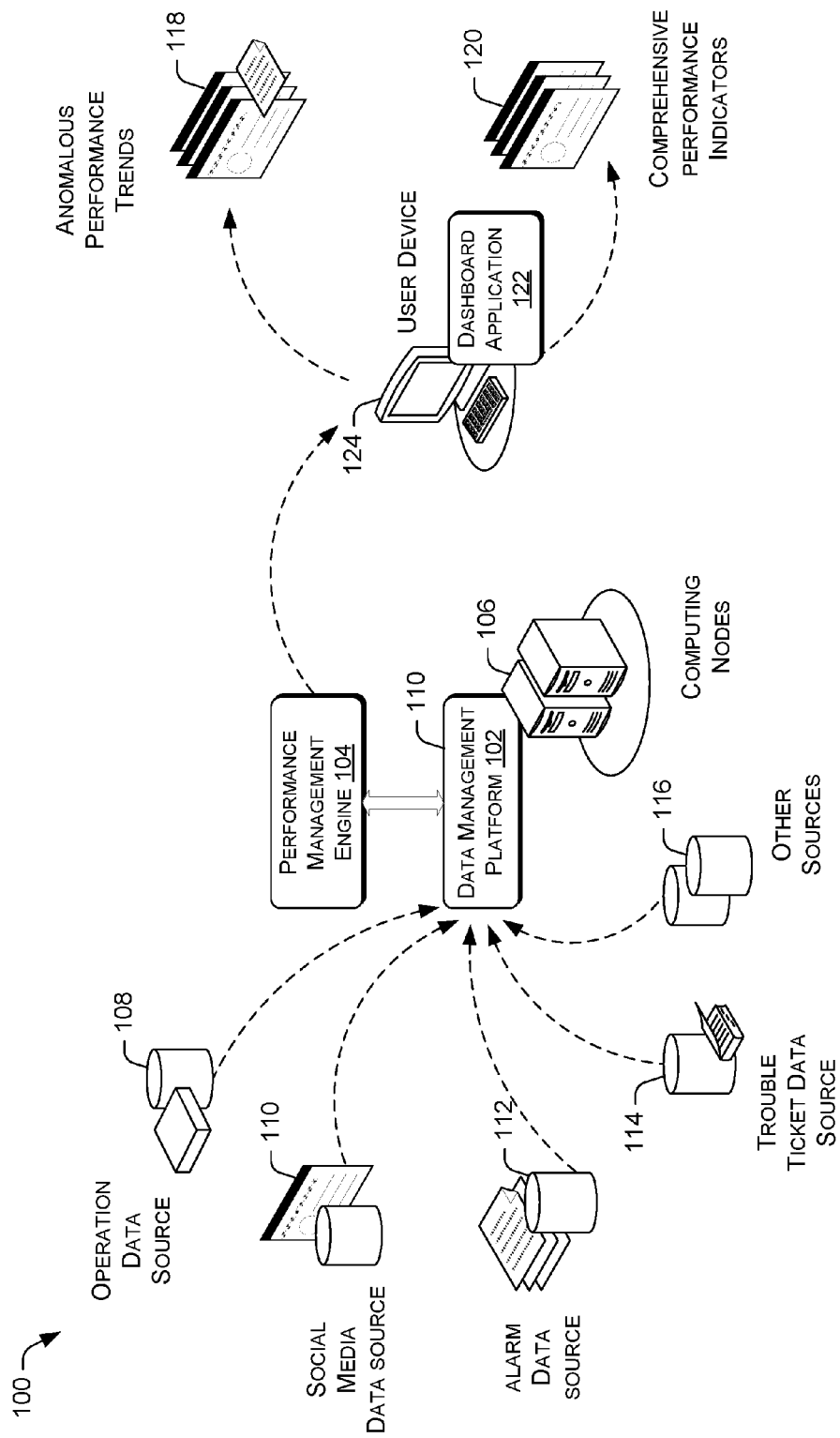
FIG. 1 illustrates an example architecture for performing distributed multi-data source performance management.

This disclosure is directed to techniques for using a performance management engine to continuously analyze data from multiple data sources in order to detect performance issues of an entity. In some instances, the entity may be a network, such as a wireless carrier network that delivers mobile communication services to end users. In other instances, the entity may be a system, such as a utility system that delivers a utility service to commercial and residential customers. The performance management engine may receive multiple sources of performance data that are relevant for determining the performance of the entity from a data management platform. In turn, the data management platform may interface with the various data collections that store relevant data. The multiple data sources may include alarm data, trouble ticket data, social media data, operation data, and key performance indicator (KPI) data of the entity. In at least one embodiment, the various data collections may be structured databases. Accordingly, the performance management engine may use data-agnostic data adapters to access the structured databases and obtain the data, in which the data-agnostic data adapters may retrieve the data from the structured databases without regard to the specific content of the data in each of the structured databases.

The performance management engine may use distributed processing to continuously analyze the multiple sources of performance data for the purpose of generating comprehensive health indicators and detecting anomalous performance trends. The distributed processing may enable the data processing functionalities of the performance management engine to be scaled up or scaled down based on workload demands. In some embodiments, the performance management engine may further implement KPI pre-calculation and performance result caching to speed up subsequent responses to performance data queries. KPI pre-calculation refers to the preemptive calculation of KPIs in anticipation of performance data queries. Once a query is received, the performance data that is relevant to the query may be deliver with minimal lag time. The performance data that is delivered in response to the query may be displayed in a visualization dashboard. In some scenarios, the visualization dashboard may present the comprehensive health indicators or anomalous performance trends graphically in charts or geographically according to locations.

The implementation of the performance management engine to execute in conjunction with the data management platform may provide a scalable solution for continuously detecting entity performance issues with minimal lag time. In contrast, convention performance management engines may take up to several minutes or even multiple hours to generate performance indicators that point to potential entity performance issues. The continuous processing of data to detect performance issues may place a heavy burden on computational resources. Accordingly, the scalable nature of the performance management engine may maximize the use of available resources by ramping up resource usage at periods of high demand, while freeing up such resources for other uses as demand drops. The techniques described herein may be implemented in a number of ways. Example implementations are provided below with reference to the following FIGS. 1-6.

Example Architecture

FIG. 1 illustrates an example architecture for performing distributed multi-data source performance management. The architecture 100 may include a data management platform 102 and a performance management engine 104. The data management platform 102 and the performance management engine 104 may execute on computing nodes 106. The computing nodes 106 may be distributed processing nodes that are scalable according to workload demand. In various embodiments, the computing nodes 106 may include general purpose computers, such as desktop computers, tablet computers, laptop computers, servers, and so forth. However, in other embodiments, the computing nodes 106 may be in the form of virtual machines, such as virtual engines (VE) and virtual private servers (VPS). The computing nodes 106 may store data in a distributed storage system, in which data may be stored for long periods of time and replicated to guarantee reliability. Accordingly, the data computing nodes 106 may provide data and processing redundancy, in which data processing and data storage may be scaled in response to demand. Further, new computing nodes 106 may be added on the fly without affecting the operational integrity of the data management platform 102 and the performance management engine 104.

The data management platform 102 may provide the performance management engine 104 with data from a variety of data sources. In turn, the data management platform 102 may access the data sources via a network. The network may be a local area network (LAN), a larger network such as a wide area network (WAN), or a collection of networks, such as the Internet. The data sources may include an operation data source 108, a social media data source 110, an alarm data source 112, trouble ticket data source 114, and other data sources 116. The operation data source 108 may include a data collection that provides data about an entity. For example, in the context of a wireless communication carrier, the operation data source 108 may include device information, user account information, and network information. The device information may indicate technical capabilities, features, and operational statuses of user devices that are used by subscribers to the wireless communication carrier. The user account information may include account details of multiple subscribers, such as account types, billing preferences, service plan subscriptions, payment histories, data consumption statistics, and/or so forth. The network information may include information regarding the technical and operation status of a wireless communication carrier. For example, the network information may include the locations and communication capabilities of base stations, the performance specifications and operation statuses of backhaul and core network components, and/or so forth. Likewise, in the context of a utility provider, the operation data source 108 may include delivery grid operation status, grid node and controller statuses, substation statuses, individual customer resource consumption statistics, expected life expectancy of infrastructure components, resource availability for distribution at different time intervals, load at each distribution point, and/or so forth.

The operation data source 108 may further provide raw performance data about the entity. For example, the performance data may include data collection statistics, data processing statistics, task completion statistics, data throughput statistics, service distribution statistics, service quality statistics, processing error statistics, service loss statistics, component failure statistics, and/or so forth. In various embodiments, the data collection of the operation data source 108 may be a structured database accessible via a data-agnostic data adapter.

The social media data source 110 may include data collections provided by social networking portals. A social networking portal may be established by an entity that is being evaluated by the performance management engine 104. Another social networking portal may be a portal that is maintained by a third-party service provider for users to share social media postings. An additional social networking portal may be a web portal that is created and maintained by a particular user solely for the particular user to present social postings. The social networking portals may enable users to post and share information, reviews, and/or other comments regarding service providers, products, services, merchants, networks, and/or so forth. For example, the social networking portals may include blog web pages, message feed web pages, web forums, and/or electronic bulletin boards. A user may establish a personalized social networking portal so that other users may subscribe to the social postings of the user, leave comments for the user or other visitors to the personalized social networking portal, and/or perform other social networking activities. In various embodiments, the data collections of the social media data source 110 may be structured databases that are accessible via corresponding data-agnostic data adapters. Once the data from the data collections are obtained via the data adapters, a data mining algorithm of the data management platform 102 may extract words, terms, phrases, quotes, or ratings that are relevant to the operational conditions or performance status of the nodes, components, and/or services of the entity. The data mining algorithm may use techniques such as decision tree learning, association rule learning, artificial neural networks, inductive logic, support vector machines, clustering, Bayesian networks, reinforcement learning, representation learning, similarity and metric learning, and sparse dictionary learning to extract the patterns. In one example, the data management platform 102 may discover a pattern of web blog posting that indicate users are dissatisfied with an aspect of a service provided by the entity at a particular geographical location. In another example, the data management platform 102 may discover a pattern of message feed postings from multiple users that indicate a specific type of user device has a high error rate when used in conjunction with the entity.

The alarm data source 112 may include alerts for the entity that are generated based on predetermined alert rules by a status monitoring application of the entity. An alert rule may specify that an alert is to be triggered when one or more conditions with respect to the operations of the entity occurs. The conditions may be specific faults or issues that are detected with components of the entity, deviation of actual performance indicators from predetermined threshold performance values, a number of user responses regarding an entity component, entity node, or entity service reaching or failing to reach a predetermined threshold, and/or so forth. In various embodiments, the data collection of the alarm data source 112 may be a structured database accessible via a data-agnostic data adapter.

The trouble ticket data source 114 may include data on issues with the components or operations of the entity. In some instances, the trouble tickets may be automatically generated by software agents that monitor the health and performance of the entity. In other instances, the trouble tickets may be manually inputted by administrators of the entity. The trouble ticket data source 114 may further include data on the identities of the administrators, resolution reports for the issues, statistics for each type or category of issues reported, statistics on issue resolution rates, and/or so forth. The additional data sources 116 may include other data sources that are controlled by the entity or third-parties, such as data reports from the tools of the entity. In various embodiments, the tools of the entity may include diagnostic tools, optimization tools, configuration tools, and/or so forth.

The performance management engine 104 may generate KPIs based on the data from the operation data source 108. The KPIs may be generated based on KPI configuration files that designate specific KPIs to be generated. In various embodiments, the performance management engine 104 may implement KPI pre-calculation and KPI caching to speed up subsequent responses to performance queries. For example, the performance management engine 104 may perform a smart selection of KPIs to pre-calculate based on the historical query demands for KPI. Accordingly, the performance management engine 104 may continuously pre-calculate such KPIs in real-time, or pre-calculate such KPIs on a periodic basis for each new time interval based on new data received from the operation data source 108. Each new time interval may be a successive time interval, a sliding window time interval, or a continuous time interval from an initial point in time. In this way, the performance management engine 104 may ensure that updated KPIs are instantly available upon the receipt of a performance data query. In another example, the performance management engine 104 may cache a particular KPI that is calculated for a request, such that the particular KPI may be delivered in response to a subsequent query for the same KPI. However, when no pre-calculated or cached KPIs are available for a receive performance data query, the performance management engine 104 may calculate the requested KPIs upon demand.

In some embodiments, the performance management engine 104 may analyze the calculated KPIs to determine performance anomalies for a given time period. In such embodiments, the performance management engine 104 may use machine learning to detect anomalous performance trends 118. The anomalous performance trends 118 may indicate an issue with components of the entity, an issue with data processed by the entity, an issue with user devices that are being serviced by the entity, and/or so forth.

In additional embodiments, the performance management engine 104 may use machine learning to analyze the calculated KPIs for an entity in conjunction with other sources of data regarding the entity in order to calculate comprehensive performance indicators for the entity. The other sources of data may include the social media data source 110, the alarm data source 112, the trouble ticket data source 114, and/or additional data sources 116. Accordingly, the performance management engine 104 may generate comprehensive performance indicators 120 that indicate performance issues with components, nodes, or services provided by the entity. The performance management engine 104 may provide the comprehensive performance indicators 120 in real-time, or on a periodic basis, such as hourly, daily, weekly, etc. As a result, appropriate alerts regarding the entity issues may be disseminated to users via alerts.

The performance management engine 104 may provide the anomalous performance trends 118 and the comprehensive performance indicators 120 to a dashboard application 122 on the user device 124. The user device 124 may be coupled to the computing nodes 106 via a network. The dashboard application 122 may be enable a user to query and view performance data of the entity. In some embodiments, the dashboard application 122 may present a dashboard interface that displays the performance data by geographical regions. In other embodiments, the dashboard interface may display the performance data via visual charts and graphs that allows the comparison and differentiation of performance data based on multiple viewing parameters.

Example Computing Device Components

Figure 2:
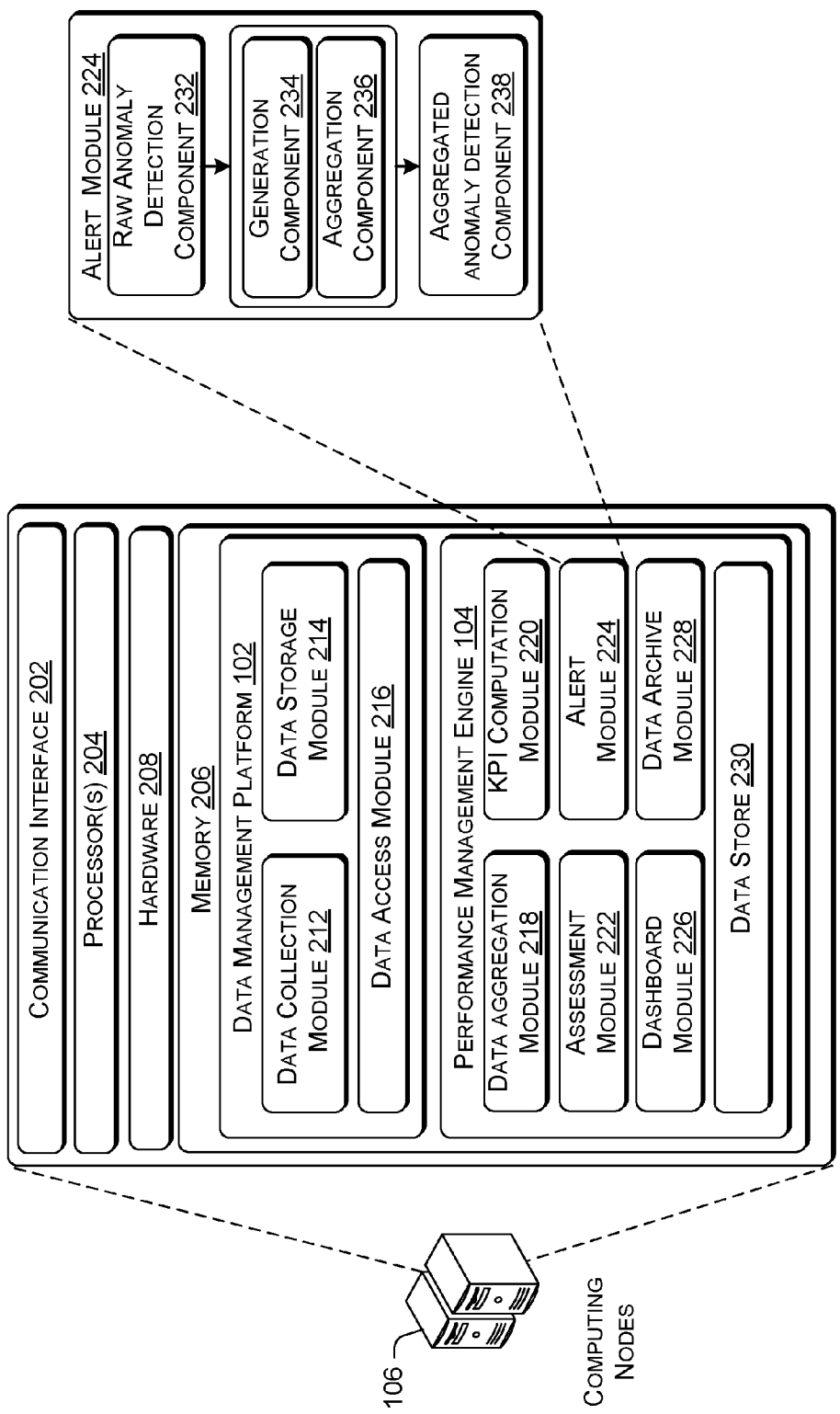
FIG. 2 is a block diagram showing various components of a data management platform and a performance management engine that performs distributed multi-data source performance management.

FIG. 2 is a block diagram showing various components of a data management platform and a performance management engine that performs distributed multi-data source performance management. The data management platform 102 and the performance management engine 104 may be implemented by one or more computing nodes 106 of a distributed processing computing infrastructure. The number of computing nodes 106 may be scaled up and down by a distributed processing control algorithm based on the data processing demands of the data management platform 102 and/or the performance management engine 104. For example, during peak performance data processing times, the number of computing nodes 106 that are executing performance data processing functionalities of the performance management engine 104 may be scaled up on the fly based on processing demand. However, once the processing demand drops, the number of computing nodes 106 that are executing the performance data processing functionalities may be reduced on the fly. Such scaling up and scaling down of the number of computing nodes 106 may be repeated over and over again based on processing demand.

The computing nodes 106 may include a communication interface 202, one or more processors 204, and memory 206. The communication interface 202 may include wireless and/or wired communication components that enable the one or more computing nodes 106 to transmit data to and receive data from other networked devices. The computing nodes 106 may be accessed via hardware 208. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The data management platform 102 may include a data collection module 212, a data storage module 214, and a data access module 216. The modules may include routines, program instructions, objects, and/or data structures that perform particular tasks or implement particular abstract data types. The data collection module 212 may use data adaptors to retrieve data from the structured databases of the data sources 108-116. Since the structured databases provide data that are accessible via simple data retrieval algorithms, the data-agnostic data adaptors may access the data sources without taking into consideration the underlying content of the data. Further, changes to the data content in each data source generally do not affect the functionality of the corresponding data-agnostic data adaptors. Thus, time, effort and financial resources may be reduced for the configuration and maintenance of the data adaptors. The data collection module 212 may include a workflow scheduler that periodically checks for and retrieves newly available data from the multiple data sources. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing.

The data storage module 214 may store data across multiple virtual data storage clusters with redundancy, so that the data may be optimized for quick access. The stored data may include the input data files and data files containing the calculated performance data. The data access module 216 may provide a data access API for accessing the data stored in the multiple virtual storage clusters. Accordingly, the API may be used by the performance management engine 104 as well as other third-party application to access the data that received and stored by the data management platform 102.

The performance management engine 104 may include a data aggregation module 218, a KPI computation module 220, an assessment module 222, an alert module 224, a dashboard module 226, and a data archive module 228. The modules may include routines, program instructions, objects, and/or data structures that perform particular tasks or implement particular abstract data types. Such modules may be executed in a distributed manner on multiple computing nodes 106 to perform performance data processing functionalities. The performance management engine 104 may also have access to a data store 230.

The data aggregation module 218 may receive data from the data management platform 102. The data received from the data management platform 102 may include data from the operation data source 108, the social media data source 110, the alarm data source 112, the trouble ticket data source 114, and/or the additional data sources 116. In turn, the data aggregation module 218 may aggregate the received data from one or more data sources into multiple datasets according to grouping parameters. The actual number of data sources whose data are aggregated at any given time may be specified by performance data queries or according to pre-determined settings. The grouping parameters may include specific time periods (e.g., hourly, daily, etc.), entity components, user device vendor, user device models, and/or so forth. In other embodiments, the grouping parameters may be used to aggregate the data into multiple datasets that correspond to different levels of an entity hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation. The data aggregation module 218 may designate a data retention period for each dataset. Upon an expiration of the data retention period, the data in the corresponding dataset may be purged by the data aggregation module 218.

The KPI computation module 220 may compute a set of KPIs based on datasets of data from the operation data source 108 based on a KPI configuration file. Thus, the KPI computation module 220 may be directed to compute new KPIs from the data in each dataset through the modifications of existing KPI configuration files or the addition of new KPI configuration files. Accordingly, the computed KPIs may measure the performance of entity subscribers, entity components, the performance of entity services, the performance of entity nodes, the overall performance of the entity, and/or so forth. For example, in the context of a wireless communication service provider, node performance that are measured by KPIs may belong to categories that include network accessibility, network congestion, customer retention, voice performance, data performance, GSM performance, UTMS performance, and/or LTE performance. Further, subscriber performance that are measured by KPIs may belong to categories that include call drops, call busy, repeat calls, 3G leak, 2G leak, and call establishment performance, GSM performance, UTMS performance, and/or LTE performance. The KPIs may be directly requested by a user query, or by the assessment module 222 in the course of generating the comprehensive performance indicators 120.

In some embodiments, the KPI computation module 220 may select specific KPIs for pre-calculation, which is the preemptive calculation of the KPIs in anticipation of performance queries. In such embodiments, the KPI computation module 220 may use machine learning algorithm to predict a set of KPIs that are likely to be requested in an upcoming time period based on historical query request information. The KPIs are then calculated based on the data by the KPI computation module 220 and cached for the upcoming time period. Thus, if a KPI of the pre-calculated KPIs is requested, the KPI computation module 220 may respond to the query with the KPI with minimal lag time. The pre-calculation of KPIs may be repeated at regularly intervals to ensure that the KPIs are always pre-calculated based on the most current data. In other instances, the KPI computation module 220 may perform caching of KPIs to reduce processing overhead. In such instances, the KPI computation module 220 may predict based on historical request data that a calculated KPI may be the subject of multiple requests within a predetermined time period. Accordingly, the KPI computation module 220 may cache a particular KPI that is generated in response to a performance data request from a first requesting party, such that the particular KPI may be distributed to a second requesting party in the predetermined time period.

In additional embodiments, the KPI computation module 220 may use machine learning to detect anomalous performance trends 118 as reflected in the KPIs over a period of time. For example, a KPI trend may be considered anomalous when there is an increase or decrease in the trend over a designated time period that exceeds a predetermined change threshold. In another example, a KPI trend may be considered anomalous when the KPI trend indicates that a change in a KPI does not fit within a pattern of changes experienced by other associated KPIs, i.e., the change in KPI deviates from the other pattern of changes by a predetermined threshold. The anomalous performance trends 118 may indicate an issue with components of the entity, an issue with data processed by the entity, an issue with user devices that are being serviced by the entity, and/or so forth. For example, a sudden drop in service throughput rate in response to a software update may indicate that the software update has caused the entity to become unstable. In another example, a service outage in a service area while the surrounding service areas are unaffected may indicate an entity component serving the service area has failed. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

The assessment module 222 may generate comprehensive performance indicators 120 using data from multiple sources. The data may include KPIs that are generated by the KPI computation module 220, social media data from the social media data source 110, alarm data from the alarm data source 112, trouble ticket data from the trouble ticket data source 114, other data from the additional data sources 116, and/or so forth. The assessment module 222 may use machine learning to analyze data from multiple sources in real-time or on a periodic basis in order to calculate comprehensive performance indicators 120 for the entity. The machine learning may identify hidden patterns, correlations, dependencies, cause and effect relationships, and/or other types of relationships between the data from the multiple data sources for multiple time intervals. Such relationships may enable the assessment module 222 to continuously generate the comprehensive performance indicators 120. Accordingly, the comprehensive performance indicators 120 may highlight issues with affiliated devices, entity components, entity nodes, or services provided by the entity, in which such issues may not be otherwise visible without the analysis of the data from the multiple sources. In various embodiments, the assessment module 222 may provide the comprehensive performance indicators 120 in real-time, or on a periodic basis, such as hourly, daily, weekly, etc. As a result, appropriate alerts regarding the entity issues may be disseminated to users via alerts.

In some embodiments, the assessment module 222 may continuously perform pre-calculation of a predetermined number of comprehensive performance indicators 120 in real-time or on a periodic basis for each new time interval. Each new time interval may be a successive time interval, a sliding window time interval, or a continuous time interval from an initial point in time. In such embodiments, each new pre-calculation may be performed as new KPIs are generated by the KPI computation module 220, and/or new data arrives at one or more of the data sources 108-116 in each new time interval. Each new time interval may be a successive time interval, a sliding window time interval, or a continuous time interval from an initial point in time. The assessment module 222 may use historical data request trends to select the predetermined number of comprehensive performance indicators. The assessment module 222 may also caching some calculated comprehensive performance indicators 120 for a predetermined time period in anticipation of repeated requests for the same comprehensive performance indicators 120 in the predetermined time period.

The alert module 224 may generate alerts for the detected performance issues with the entity based on alert rules. In various embodiments, the alert module 224 may include a raw anomaly detection component 232, a generation component 234, an aggregation component 236, and an aggregated anomaly detection component 238. The raw anomaly detection component 232 may generate alerts based on KPI values and KPI value thresholds. Accordingly, when the raw anomaly detection components 232 detects that a KPI value as computed by the KPI computation module 220 has exceeded or dropped below a corresponding KPI value threshold, the raw anomaly detection component 232 may trigger the generation component 234 to generate an alert. For example, when a dropped call rate is greater than a threshold of two percent, then an alert may be generated.

The aggregation component 236 may aggregate the multiple alerts that are generated for a particular subscriber, device, component, or service of an entity in a time period to create a current KPI trend of alerts over the time period. Accordingly, the aggregated anomaly detection component 238 may compare the current KPI trend of alerts to similar KPI trends of alerts for other time periods. Accordingly, if the current KPI trend of alerts differs from a previous KPI trend of alerts or a derived trend representation of several previous KPI trends by a predetermined deviation threshold, then the aggregated anomaly detection component 238 may generate a special aggregate alert for the KPI trend of alerts. In various embodiments, the alert module 224 may generate alerts at different hierarchical levels of the entity. For example, the alerts may be generated at a subscriber level, a device level, an entity component level, an entity node level, a service level, and/or the entity level. In some instances, the alerts may provide or suggest solutions for remedying faults. The alert rules that are used by the alert module 224 may be updated in order to generate new types of alerts. The alert module 224 may provide the alerts to the dashboard application 122 for presentation to a user. In some instances, the alert module 224 may further correlate a special aggregate alert with other context data, such as alarm data, geolocation data, configuration data, sentiment data, and/or performance data to detect failure points in the entity. In such instances, the data that is correlated may belong to subscribers, devices, components, nodes, or services of the entity, Likewise, the failure point may be a device, a component, a node, or a service of the entity. Additional details regarding the analysis performed by the alert module 224 are described in FIGS. 6 and 7.

The dashboard module 226 may generate multiple analytic views that present the KPIs and the anomalous performance trends 118 as produced by the KPI computation module 220, as well as the comprehensive performance indicators 120 as produced by the assessment module 222. The dashboard module 226 may generate the analytic views in response to KPI requests or performance indicator requests that are initiated at the dashboard application 122 on the user device 124. In turn, the dashboard module 226 may send the analytic views to the dashboard application 122 via a network for display by the dashboard application 122. The analytic views may include geographical map views that present the data in the context of geographical locations. The analytic views may further include charts that present the in chart or graph format. Each of the KPIs, the anomalous performance trends 118, and/or the comprehensive performance indicators 120 may be presented or filtered for presentation in the analytic views in accordance with specific time periods, with respect to one or more specific components, nodes, or services, with respect to one or more users or requestors, in aggregation or comparison arrangements with each other or other data, and/or so forth.

The dashboard module 226 may have built in reporting features that simplify the data querying and requesting process for a user. In one scenario, a user may desire to ascertain performance issues that occurred with an entity as a result of a recent modification to an aspect of the entity. In a conventional performance reporting tool, the user will have to designate a geographical area of interest, a time period of interest, and KPIs that are to be queried. Subsequently, the conventional tool may calculate and present the KPIs of interest. The user is then able to view and examine the KPIs of interest to see if any anomalies indicating performance issues are present. In contrast, the dashboard module 226 may be configured such that the user may input a time period and a geographical area of interest. In turn, the dashboard module 226 may cause the KPI computation module 220 to calculate KPI trends or retrieve pre-calculated KPI trends for the time period and the geographical area of interest. Subsequently, the KPI computation module 220 may use machine learning to identify one or more of these KPI trends as anomalous performance trends 118. The alert module 224 may generate alerts for the anomalous performance trends 118 for presentation by the dashboard module 226. In turn, the user that viewed the alerts may send a query via the dashboard module 226 selecting for viewing a particular anomalous performance trend that is identified by an alert. Accordingly, the KPI computation module 220 may use the dashboard module 226 to display the selected anomalous performance trend at the user device 124.

The data archive module 228 may archive the data that is received from the data management platform 102 into a data store 230. In various embodiments, the data store 230 may include one or more databases, such as relational databases, object databases, object-relational databases, and/or key-value databases. The data archived in the data store 230 may enable the various modules of the performance management engine 104 to recalculate the KPIs, the anomalous performance trends, and the comprehensive performance indicators based on the data as received in their original state. In this way, the performance management engine 104 may in essence return back in time in instances where the computations are to be repeated for verification, auditing, or troubleshooting.

Example Processes

FIGS. 3-6 present illustrative processes 300-600 for performing for performing distributed multi-data source performance management. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 400-600 are described with reference to the architecture 100 of FIG. 1.

Figure 3:
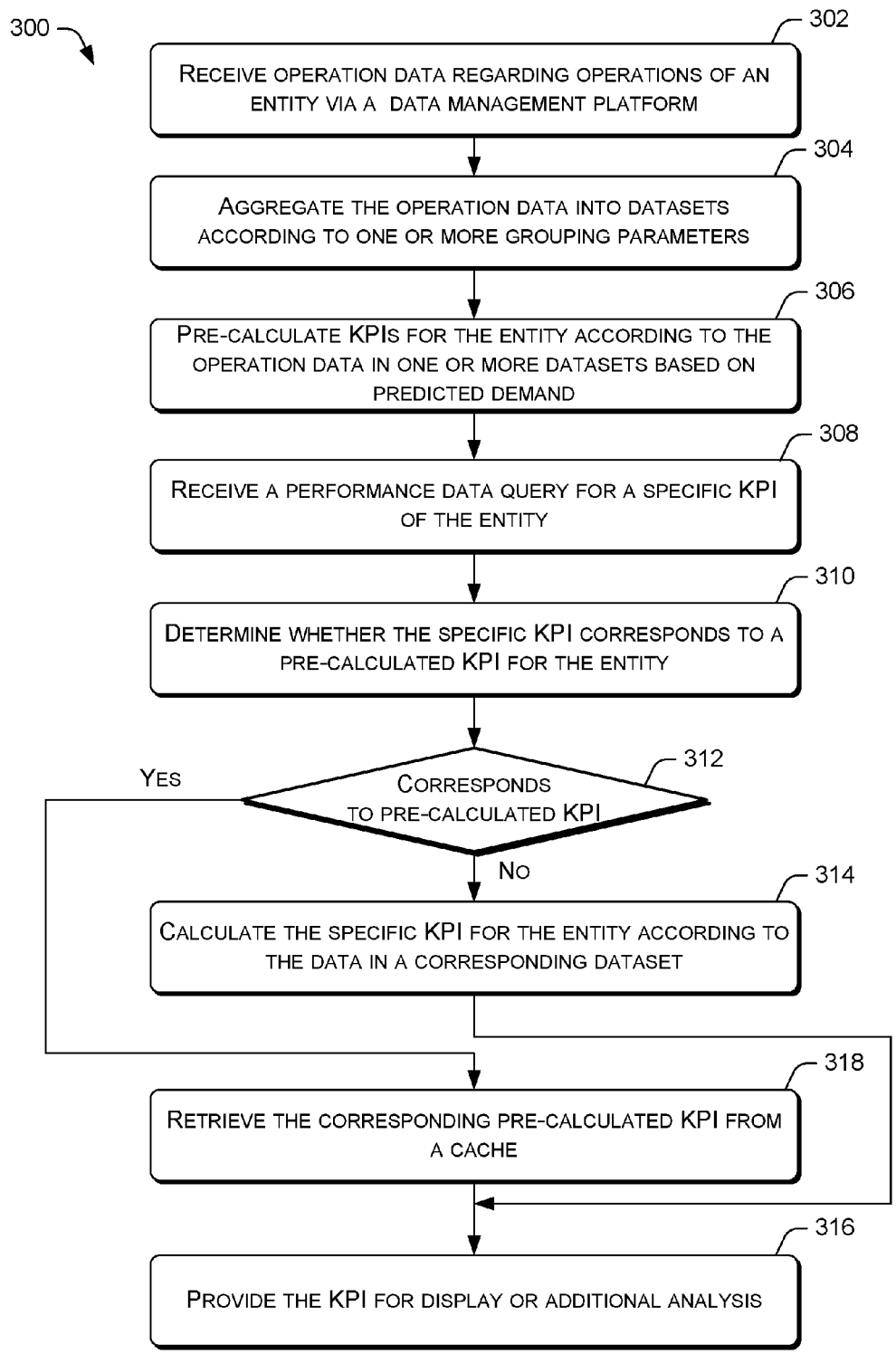
FIG. 3 is a flow diagram of an example process for using KPI pre-calculation and caching to reduce KPI processing overhead and respond to queries for KPIs.

FIG. 3 is a flow diagram of an example process 300 for using KPI pre-calculation and caching to reduce KPI processing overhead and respond to queries for KPIs. At block 302, the performance management engine 104 may receive operation data regarding operations of an entity via the data management platform 102. The operation data may include performance data about the entity. For example, the performance data may include data collection statistics, data processing statistics, task completion statistics, data throughput statistics, service distribution statistics, service quality statistics, processing error statistics, service loss statistics, component failure statistics, and/or so forth. The operation data may be stored in a structured database that is accessible via a data-agnostic data adapter.

At block 304, the performance management engine 104 may aggregate the operation data into datasets according to one or more grouping parameters. In various embodiments, the grouping parameters may include specific time periods (e.g., hourly, daily, etc.), entity components, user device vendor types, user device models, and/or so forth. In other embodiments, the grouping parameters may be used to aggregate the data into multiple datasets that correspond to different levels of an entity hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation.

At block 306, the performance management engine 104 may pre-calculate KPIs for the entity according to the operation data in one or more datasets based on predicted demand. Pre-calculation is the preemptive calculation of the KPIs in anticipation of performance queries. In some embodiments, the performance management engine 104 may use machine learning algorithm to predict one or more KPIs that are likely to be requested in an upcoming time period based on historical query request information. Such KPIs are then calculated by the performance management engine 104 and cached for the upcoming time period. In other embodiments, the performance management engine 104 may have pre-calculated the KPIs in response to previous queries, and have cached the KPIs with the expectation that the KPIs are likely to be requested again by the same party or a third-party within a predetermined period of time.

At block 308, the performance management engine 104 may receive a performance data query for a specific KPI of the entity via dashboard interface. In some embodiments, the query may be initiated by a user via a dashboard application 122 that is on the user device 124. In other embodiments, the query may be initiated by an analytical component of the performance management engine 104, such as the assessment module 222. The assessment module 222 may desire to perform a further analysis of the KPI in conjunction with one or more additional sources of data.

At block 310, the performance management engine 104 may determine whether the specific KPI corresponds to a pre-calculated KPI for the entity. Accordingly, at decision block 312, if the performance management engine 104 determines that the specific KPI as requested is not the same as a pre-calculated KPI ("no" at decision block 312), the process 300 may proceed to block 314. At block 314, the performance management engine 104 may calculate the specific KPI for the entity according to the data in a corresponding dataset. In various embodiments, the computed KPIs may measure the performance of one or more entity components, the performance of one or more entity services, the performance of one or more entity nodes, the overall performance of the entity, and/or so forth.

At block 316, the performance management engine 104 may provide the KPI for display or additional analysis. In instances in which the KPI is provided for display, the performance management engine 104 may send the KPI to the dashboard application 122 on the user device 124 for presentation in an analytic view. However, in instances in which the KPI is provided for additional analysis, the KPI may be analyzed in conjunction with other sources of data to generate comprehensive performance indicators.

Returning to decision block 312, if the performance management engine 104 determines that the specific KPI as requested is the same as a pre-calculated KPI ("yes" at decision block 312), the process 300 may proceed to block 318. At block 318, the performance management engine 104 may retrieve the corresponding pre-calculated KPI from a cache. Subsequently, the process 300 may return to block 316 such that the performance management engine 104 may provide the KPI for display or additional analysis.

Figure 4:
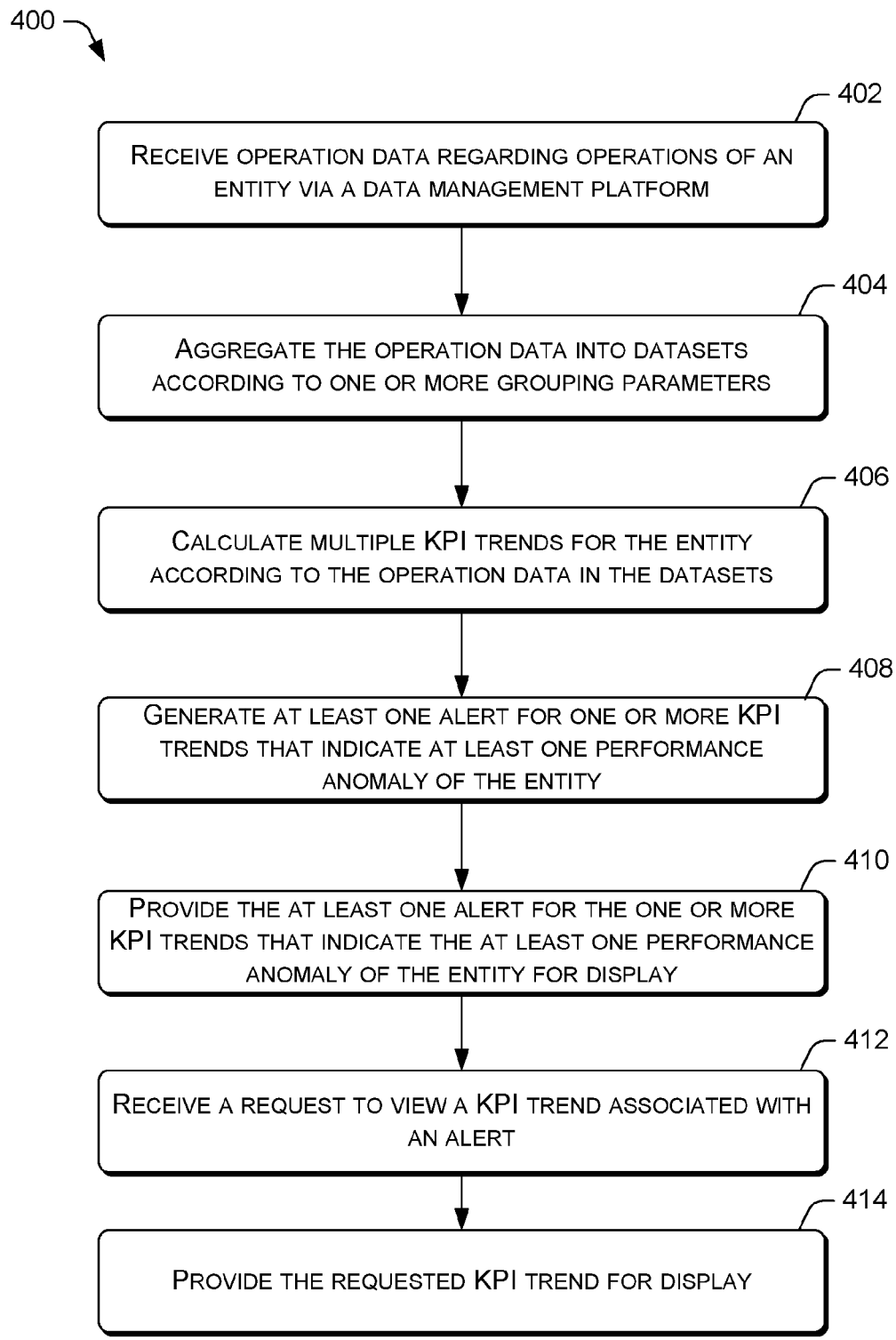
FIG. 4 is a flow diagram of an example process for providing an anomalous performance trend that indicates an anomaly in response to a user query.

FIG. 4 is a flow diagram of an example process 400 for providing an anomalous performance trend that indicates an anomaly in response to a user query. At block 402, the performance management engine 104 may receive operation data regarding operations of an entity via the data management platform 102. The operation data may include performance data about the entity. For example, the performance data may include data collection statistics, data processing statistics, task completion statistics, data throughput statistics, service distribution statistics, service quality statistics, processing error statistics, service loss statistics, component failure statistics, and/or so forth. The operation data may be stored in a structured database that is accessible via a data-agnostic data adapter.

At block 404, the performance management engine 104 may aggregate the operation data into datasets according to one or more grouping parameters. In various embodiments, the grouping parameters may include specific time periods (e.g., hourly, daily, etc.), entity components, user device vendors, user device models, and/or so forth. In other embodiments, the grouping parameters may be used to aggregate the data into multiple datasets that correspond to different levels of an entity hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation.

At block 406, the performance management engine 104 may calculate multiple KPI trends for the entity according to the operation data in the datasets. In some embodiments, the KPI trend may be continuously calculated or calculated on a periodic basis for new time intervals by the performance management engine 104, as new KPIs are calculated based on new data that is received via the data management platform 102. In this way, the performance management engine 104 may continuously monitor the KPIs to detect anomalies in the KPIs.

At block 408, the performance management engine 104 may generate at least one alert for one or more KPI trends that indicate at least one performance anomaly of the entity. In various embodiments, the performance management engine 104 may detect one or more KPI trends that show at least one performance anomaly in the entity. Such a KPI trend may be referred to as an anomalous performance trend.

The anomalous performance trends may be relevant to a specific geographical area and a specific time period that is queried by a user. For example, the user may desire to ascertain performance issues that occurred with an entity as a result of a recent modification to an aspect of the entity.

At block 410, the performance management engine 104 may provide the at least one alert for the one or more trends for display In various embodiments, the performance management engine 104 may send the alerts to the dashboard application 122 on the user device 124 for presentation. The alerts may provide or suggest solutions for remedying faults with the entity.

At block 412, the performance management engine 104 may receive a request to view a KPI trend associated with an alert. The request may be received via the dashboard application 122 on the user device 124. At block 414, the performance management engine 104 may provide the requested KPI trend for display on the dashboard application 122 of the user device 124.

However, in alternative embodiments, the performance management engine 104 may detect one or more anomalous KPI trends upon demand. In such embodiments, the performance management engine 104 may receive a user selection of a geographical area via a dashboard interface provided by the dashboard application 122. In turn, the performance management engine 102 may calculate KPI trends based on data from one or more data sources. Upon detecting that one or more of the KPI trends are anomalous, the performance management engine 102 may generate corresponding alerts for the one or more anomalous KPI trends. Subsequently, the user may use the dashboard application 122 to select an anomalous KPI trend for viewing. In this way, the performance management engine 102 may perform the generation of the alerts on demand, rather than on a continuous basis.

Figure 5:
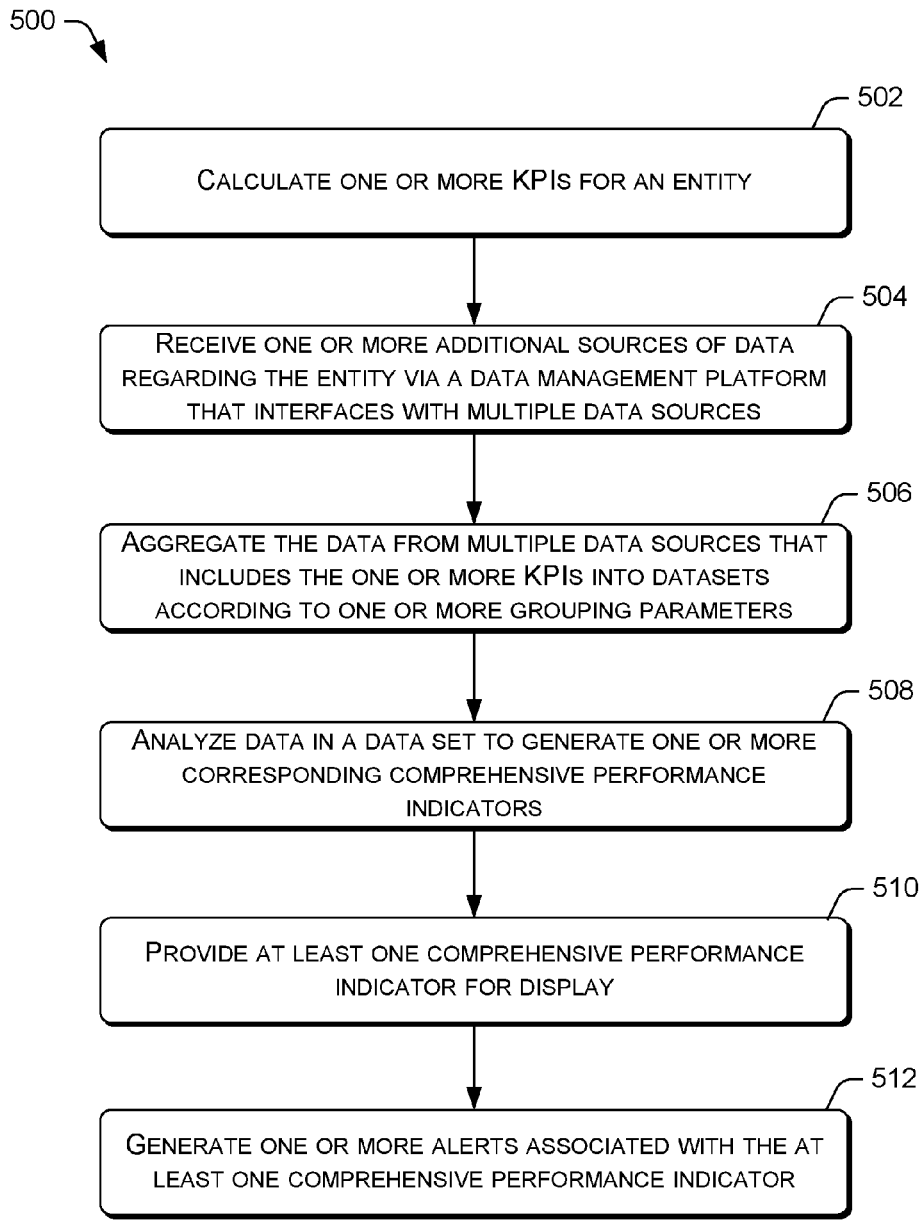
FIG. 5 is a flow diagram of an example process for providing comprehensive health indicators based on the analysis of data from multiple data sources.

FIG. 5 is a flow diagram of an example process 500 for providing comprehensive health indicators based on the analysis of data from multiple data sources. At block 502, the performance management engine 104 may calculate one or more KPIs for an entity. In various embodiments, the computed KPIs may measure the performance of entity components, the performance of entity services, the performance of entity nodes, the overall performance of the entity, and/or so forth. The one or more KPIs may be computed based on data from the operation data source 108.

At block 504, the performance management engine 104 may receive one or more additional sources of data regarding the entity via the data management platform 102. The additional data sources may include the social media data source 110, the alarm data source 112, the trouble ticket data source 114, the additional data sources 116, and/or so forth.

At block 506, the performance management engine 104 may aggregate the data from multiple data sources into datasets according to one or more grouping parameters. The multiple sources of data may include the one or more KPIs that are previously calculated for the entity. In various embodiments, the grouping parameters may include specific time periods (e.g., hourly, daily, etc.), entity components, user device vendor types, user device models, and/or so forth. In other embodiments, the grouping parameters may be used to aggregate the data into multiple datasets that correspond to different levels of an entity hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation.

At block 508, the performance management engine 104 may analyze the data in each dataset to generate one or more corresponding comprehensive performance indicators. In various embodiments, machine learning may be used to analyze the data from multiple sources in order to calculate the comprehensive performance indicators for the entity. The comprehensive performance indicators may specify issues with affiliated devices, entity components, entity nodes, or services provided by the entity, in which such issues may not be otherwise visible without the analysis of the data from the multiple sources.

At block 510, the performance management engine 104 may provide at least one comprehensive performance indicator for display. In various embodiments, the performance management engine 104 may send the at least one comprehensive performance indicator to the dashboard application 122 on the user device 124 for presentation in an analytic view.

At block 512, the performance management engine 104 may provide one or more alerts associated with the at least one comprehensive performance indicator. In various embodiments, the alerts may be generated at different hierarchical levels of the entity. For example, the alerts may be generated at the subscriber, the device, and/or the entity infrastructure element level. In some instances, the alerts may provide or suggest solutions for remedying faults with the entity. The alerts may be presented by the dashboard application 122 on the user device 124.

Figure 6:
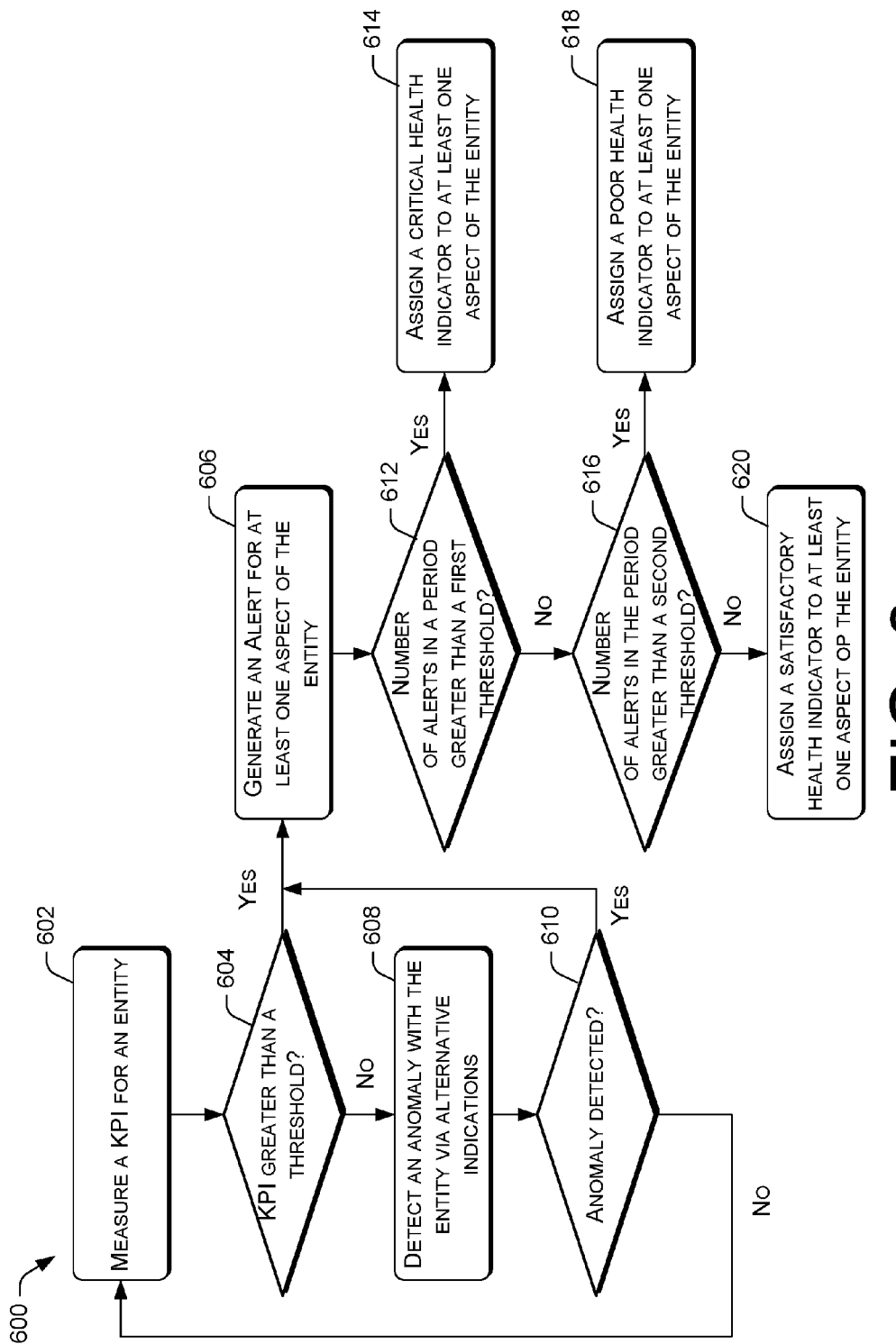
FIG. 6 is a flow diagram of an example process for using self-created alerts to detect anomalies of an entity.

FIG. 6 is a flow diagram of an example process 600 for using self-created alerts to detect anomalies with of an entity. At block 602, the performance management engine 104 may measure a KPI for an entity. In various embodiments, the KPI may be for one or more aspects of the entity or the entity as a whole. The aspects of the entity may include subscribers, devices, nodes, components, services, geographical areas, and/or other aspects of the entity. At decision block 604, the performance management engine 104 may determine whether the KPI is greater than a predetermined KPI threshold. Accordingly, if the KPI is greater than a predetermined threshold ("yes" at decision block 604), the process 600 may proceed to block 606. At block 606, the performance management engine 104 may generate an alert for at least one aspect of the entity.

However, returning to decision block 604, if the performance management engine 104 determines that the KPI is not greater than a predetermined threshold ("no" at decision block 604, the process 600 may proceed to block 608. At block 608, the performance management engine 104 may detect an anomaly with the entity via alternative indications. For example, the alternative indications may include a comprehensive health indicator, a KPI trend, and/or so forth. Accordingly, at decision block 610, if the performance management engine 104 determines that an anomaly is not detected ("no" at decision block 610), the process 600 may loop back to block 602. However, if the performance management engine 104 determines that an anomaly is detected ("yes" at decision block 610), the process may loop to block 606. At block 606, the performance management engine 104 may generate an alert for the entity.

At decision block 612, the performance management engine 104 may determine whether a number of alerts in a time period is greater than a first threshold. Accordingly, if the number of alerts is greater than the first threshold ("yes" at decision block 612), the process 600 may proceed to block 614. At block 614, the performance management engine 104 may assign a "critical" health indicator to at least one aspect of the entity. However, if the number of alerts is not greater than the first threshold ("no" at decision block 612, the process 600 may proceed to decision block 616.

At decision block 616, the performance management engine 104 may determine whether the number of alerts in the time period is greater than a second threshold, in which the second threshold is less than the first threshold. Accordingly, if the number of alerts is greater than the second threshold ("yes" at decision block 616), the process 600 may proceed to block 618. At block 618, the performance management engine 104 may assign a "poor" health indicator to at least one aspect of the entity. In such instances, a performance condition of the at least one aspect as noted by a "poor" health indicator may be not as bad as noted by a "critical" health indicator. However, if the number of alerts is not greater than the second threshold ("no" at decision block 616), the process 600 may proceed to block 620. At block 620, the performance management engine 104 may assign a "satisfactory" health indicator to at least one aspect the entity to indicate that the performance condition of the at least one aspect is satisfactory.

Figure 7:
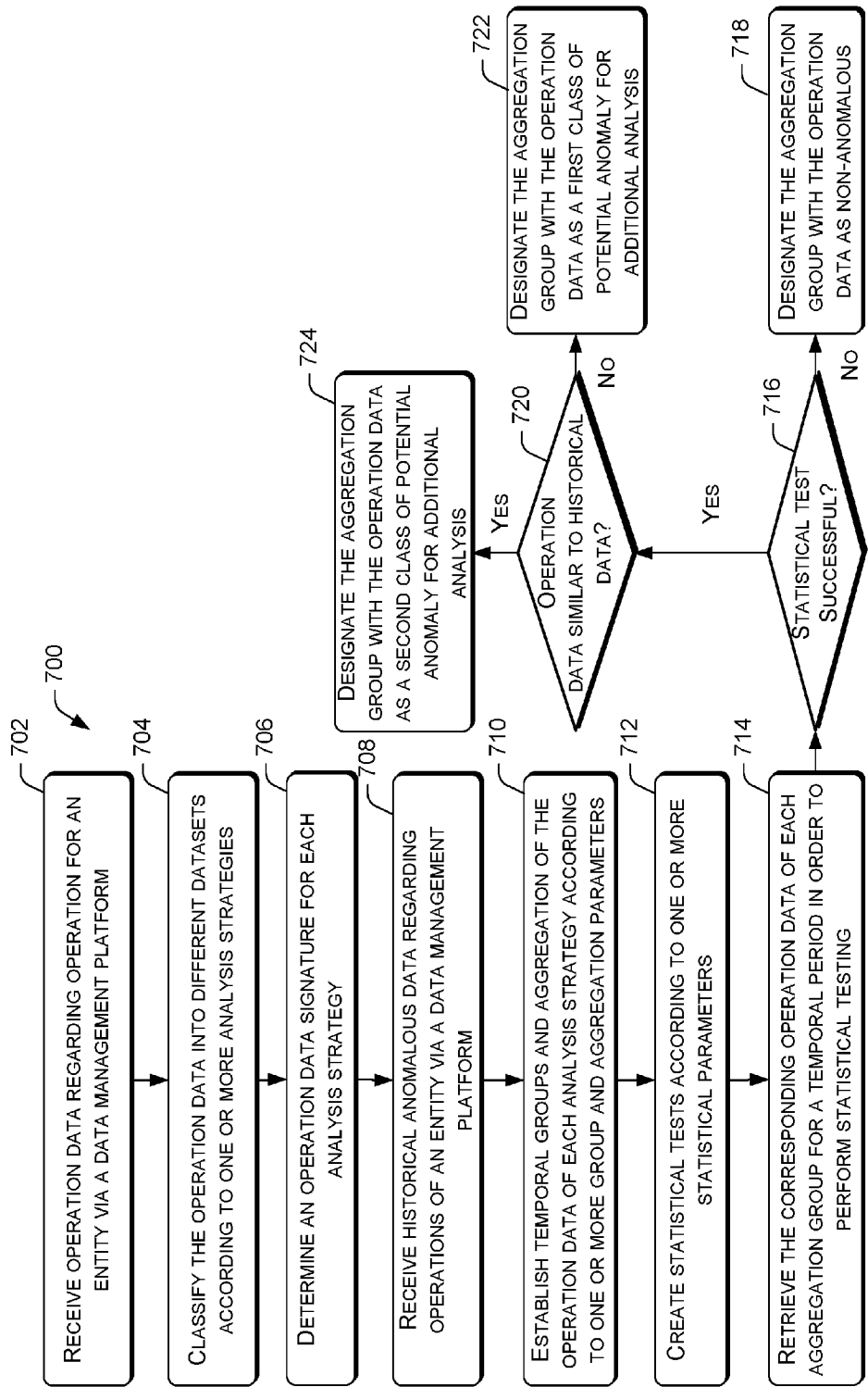
FIG. 7 is a flow diagram of an example process for detecting anomalies associated with an entity using historical anomaly data.

FIG. 7 is a flow diagram of an example process 700 for detecting anomalies associated with an entity using historical anomaly data. At block 702, the performance management engine 104 may receive operation data regarding operation for an entity via the data management platform 102. In various embodiments, the operation data may pertain to subscribers, devices, components, nodes, services, and/or geographical areas of the entity. At block 704, the performance management engine 104 may classify the operation data into different data sets according to one or more analysis strategies. In various embodiments, the analysis strategy may be a KPI trend analysis strategy, a comprehensive health indicator analysis strategy, a multi-level analysis strategy, and/or so forth.

At block 706, the performance management engine 104 may determine an operation data signature for each analysis strategy. In various embodiments, the operation data signature may serve to uniquely identify the operation data that is analyzed using a particular analysis strategy. At block 708, the performance management engine 104 may receive historical anomalous data regarding operations of an entity via the data management platform 102. The historical anomalous data may be for a predetermined time period, and may contain data regarding subscribers, devices, components, nodes, services, and/or geographical areas of the entity.

At block 710, the performance management engine 104 may establish temporal groups and aggregation of the operation data of each analysis strategy according to one or more group and aggregation parameters. In various embodiments, such parameters may include specific time periods (e.g., hourly, daily, etc.), entity components, user device vendor, user device models, and/or so forth. In other embodiments, the group and aggregation parameters may correspond to different levels of an entity hierarchy. At block 712, the performance management engine 104 may create statistical tests according to one or more statistical parameters. In some embodiments, the performance management engine 104 may create a corresponding statistical test for each aggregation group. In other embodiments, common statistical tests may be created for all the aggregation groups.

At block 714, the performance management engine 104 may retrieve the corresponding operation data of each aggregation group for a temporal period. The aggregation groups may be retrieved for the purpose of performing the statistical testing. Accordingly, if the performance management engine 104 determines that a statistical testing of the operation data for an aggregation group is not successful ("no" at decision block 716), the process 700 may proceed to block 718. At block 718, the performance management engine 104 may designate the aggregation group with the operation data as non-anomalous. However, if the performance management engine 104 determines that the statistical testing of the operation data of an aggregation group is successful ("yes" at decision block 716), the process 700 may proceed to decision block 720.

At decision block 720, the performance management engine 104 may determine if the operation data in the aggregation group is similar to historical data. The historical data may be operation data for a similar aggregation group from a predetermined time period in the past that has the same duration as the temporal period. Accordingly, if the performance management engine 104 determines that the operation data is not similar to the historical data ("no" at decision block 720), the process 700 may proceed to block 722.

At block 722, the performance management engine 104 may designate the aggregation group with the operation data as a first class of potential anomaly for additional analysis. However, if the performance management engine 104 determines that the operation data is similar to the historical data ("yes" at decision block 720), the process 700 may proceed to block 724. At block 724, the performance management engine 104 may designate the aggregation group with the operation data as a second class of potential anomaly for additional analysis. The first class and the second class may be classifications that indicate the different severity of the anomaly. Furthermore, the operations in blocks 716-724 may be repeated for each aggregation group that is established at block 710.

Figure 8:
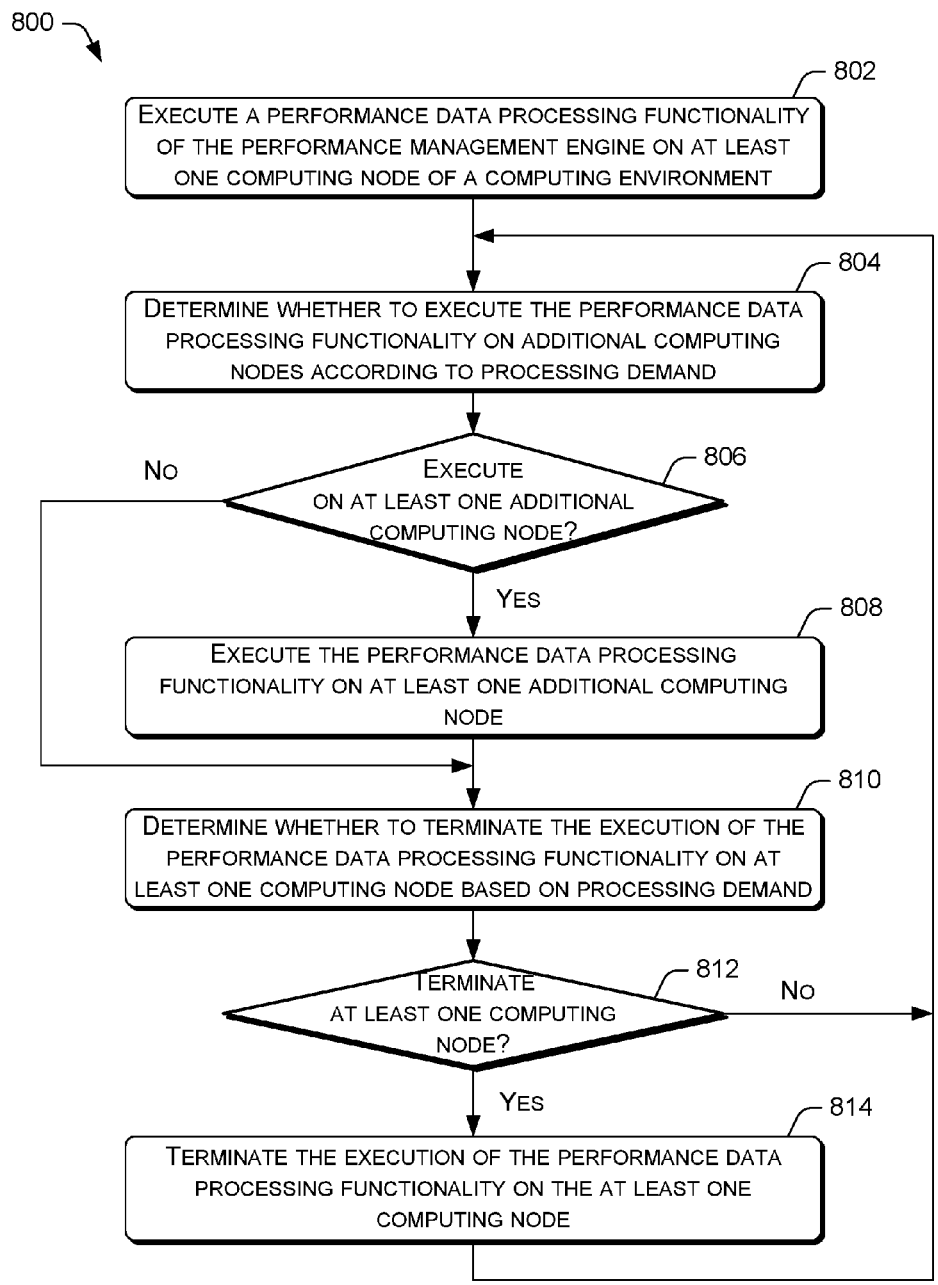
FIG. 8 is a flow diagram of an example process for performing automatic scaling of performance data processing according to workload.

FIG. 8 is a flow diagram of an example process 800 for performing automatic scaling of performance data processing according to workload. At block 802, a distributed processing control algorithm may execute a performance data processing functionality of the performance management engine 104 on at least one computing node of a computing environment. In various embodiments, the computing nodes may be in the form of computing devices, virtual machines, or software containers.

At block 804, the distributed processing control algorithm may determine whether to execute the performance data processing functionality one additional computing nodes according to processing demand. The processing demand may be dictated by a particular data output response time, data output capacity over a time period, a task completion time, or other quality of service (QoS) parameters. Thus, the current execution of the performance data processing functionality on the one or more computing nodes may be insufficient to meet the workload objectives.

At decision block 806, if the distributed processing control algorithm determines that the performance data processing functionality is to be executed on at least one additional computing node ("yes" at decision block 806), the process 800 may proceed to block 808. At block 808, the distributed processing control algorithm may execute the performance data processing functionality on at least one additional computing node. In various embodiments, the number of computing nodes to execute the performance data processing functionality may be automatically scaled up to meet the processing demand. Returning to decision block 806, if the distributed processing control algorithm determines that the performance data processing functionality is not to be executed by at least one additional computing node ("no" at decision block 806), the process 800 may proceed to block 810.

At block 810, the distributed processing control algorithm may determine whether to terminate the execution of the performance data processing functionality on at least one computing node based on processing demand. In various embodiments, the distributed processing control algorithm may detect reduced workload demand for executing the performance data processing functionality. The detection may be based on a reduction in the number of data processing requests in a particular time period, a reduction in incoming data, and/or so forth. For example, demand for performance data processing services may be reduced during certain times of the day, week, month, etc.

At decision block 812, if the distributed processing control algorithm determines that the execution of the performance data processing functionality is to be terminated on at least one computing node ("yes" at decision block 812), the process 800 may proceed to block 814. At block 814, the distributed processing control algorithm may terminate the execution of the performance data processing functionality on the at least one computing node. In various embodiments, the distributed processing control algorithm may terminate one or more computing nodes that are executing the performance data processing functionality to free up computing resources for performing other computing tasks. Subsequently, the process 800 may loop back to block 804. However, returning to decision block 812, if the distributed processing control algorithm determines that no execution of the performance data processing functionality is to be terminated ("no" at decision block 812), the process 800 may directly loop back to block 804.

The implementation of the performance management engine to execute in conjunction with the data management platform may provide a scalable solution for continuously detecting entity performance issues with minimal lag time. In contrast, convention performance management engines may take up to several minutes or even several hours to generate performance indicators that point to potential entity performance issues. The continuous processing of data to detect performance issues may place a heavy burden on computational resources. Accordingly, the scalable nature of the performance management engine may maximize the use of available resources by ramping up resource usage at periods of high demand, while freeing up such resources for other uses as demand drops.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more non-transitory computer-readable media storing computer-executable instructions that upon execution cause one or more processors to perform acts comprising:
    calculating one or more key performance indicators (KPIs) for an entity, the calculating the one or more KPIs including:
        receiving operation data regarding operations of the entity via the data management platform,
        aggregating the operation data into a plurality of datasets according to one or more grouping parameters, selecting one or more predicted KPIs for the entity based on historical query request information, the one or more predicted KPIs being likely to be requested in an upcoming time period, and pre-calculating the one or more predicted KPIs for the entity according to the operation data in one or more datasets of the plurality of datasets, receiving one or more additional sources of data regarding the entity via a data management platform that interfaces with multiple data sources;

aggregating the one or more KPIs and the one or more additional sources of data into datasets according to one or more grouping parameters;

analyzing data in one or more datasets to generate one or more comprehensive performance indicators; and providing at least one comprehensive performance indicator for display on a user device, wherein each KPI and each comprehensive performance indicator respectively indicates a performance of a device, a component, a node, or a service of the entity.

2. The one or more non-transitory computer-readable media of claim 1, wherein the one or more additional sources of data includes a social media data source, an alarm data source of the entity, a trouble ticket data source of the entity, or a tool data source of the entity.

3. The one or more non-transitory computer-readable media of claim 1, wherein a comprehensive performance indicator specifies a performance issue associated with the entity, and wherein the acts further comprise:

generating one or more alerts associated with the comprehensive performance indicator; and providing the one or more alerts for presentation on a user device, the one or more alerts providing at least one solution for remedying the performance issue with the entity.

4. The one or more non-transitory computer-readable media of claim 1, wherein the calculating the one or more KPIs further includes:

determining whether a specific KPI that is requested corresponds to a pre-calculated predicted KPI, the specific KPI being requested for fulfilling a performance data query that is initiated at a user device or generating a comprehensive performance indicator, retrieving the pre-calculated predicted KPI from a KPI cache for presentation on the user device or generation of the comprehensive performance indicator in response to a determination that the specific KPI corresponds to the pre-calculated predicted KPI, and calculating the specific KPI for the entity according to the operation data in a corresponding dataset of the plurality of datasets, and providing the specific KPI for presentation on the user device or the generation of the comprehensive performance indicator, in response to a determination that the one or more predicted KPIs as pre-calculated fail to correspond to the specific KPI.

5. The one or more non-transitory computer-readable media of claim 4, wherein the performance data query is from a particular party, and the one or more KPIs are pre-calculated for a prior performance data query from a previous party that differs from the particular party.

6. The one or more non-transitory computer-readable media of claim 4, wherein the retrieving or providing for presentation includes send a KPI to the user device for display in a geographical view or a chart view.

7. The one or more non-transitory computer-readable media of claim 1, where the acts further comprise:

receiving operation data regarding operations of the entity via the data management platform;

aggregating the operation data into a plurality of datasets according to one or more grouping parameters;

calculating multiple KPI trends for the entity according to the operation data in the datasets;

receiving an anomaly query for the entity that specifies a geographical location and a time period without specifying one or more KPIs to be retrieved; and providing one or more KPI trends that show at least one performance anomaly of the entity in response to the anomaly query.

8. The one or more non-transitory computer-readable media of claim 7, wherein the acts further comprise:

receiving a request to view a KPI trend associated with an alert, the KPI trend indicating a performance anomaly of the entity; and providing the requested KPI trend for presentation on a user device.

9. The one or more non-transitory computer-readable media of claim 1, wherein the one or more grouping parameters include a specific time period, a specific entity component, a specific user device vendor, a specific user device model, or different levels of an entity hierarchy that includes a subscriber level, a device level, a service area level, and a geographical market level, wherein the geographical level further includes a zip code sublevel, a municipality sublevel, or an additional location-based level.

10. The one or more non-transitory computer-readable media of claim 1, wherein the entity is a wireless communication carrier that delivers telecommunication service to subscribers or a utility system that delivers a utility service to customers.

11. The one or more non-transitory computer-readable media of claim 1, wherein the calculating includes calculating the one or more KPIs continuously on a periodic basis for new time intervals based on new operation data from an operation data source of the entity, and the analyzing includes continuously analyzing or analyzing on a periodic basis using newly calculated KPIs and new data from the one or more data sources.

12. The one or more non-transitory computer-readable media of claim 1, further comprising increasing a number of computing nodes that perform the calculating one or more KPIs or the analyzing data in the one or more datasets in response to an increase in performance data processing load, or decreasing the number of computing nodes that perform the calculating one or more KPIs or the analyzing data in the one or more datasets in response to a decrease in performance data processing load.

13. A computer-implemented method, comprising:

calculating one or more key performance indicators (KPIs) for an entity via a performance management engine that executes on one or more computing nodes, the calculating the one or more KPIs including:

receiving operation data regarding operations of the entity via the data management platform;

aggregating the operation data into a plurality of datasets according to one or more grouping parameters;

selecting one or more predicted KPIs for the entity based on historical query request information, the one or more predicted KPIs being likely to be requested in an upcoming time period, and pre-calculating the one or more predicted KPIs for the entity according to the operation data in one or more datasets of the plurality of datasets;

receiving one or more additional sources of data regarding the entity via a data management platform that interfaces with multiple data sources, the multiple data sources further including one or more of a social media data source, an alarm data source of the entity, a trouble ticket data source of the entity, or a tool data source of the entity;

aggregating the one or more KPIs and the one or more additional sources of data into datasets according to one or more grouping parameters, the one or more grouping parameters include a specific time period, a specific entity component, a specific user device vendor, a specific user device model, or different levels of an entity hierarchy that includes a subscriber level, a device level, a service area level, and a geographical market level;

analyzing data in one or more datasets to generate one or more comprehensive performance indicators via the performance management engine; and providing at least one comprehensive performance indicator for display on a user device, wherein each KPI and each comprehensive performance indicator respectively indicates a performance of a device, a component, a node, or a service of the entity.

14. The computer-implemented method of 13, wherein the calculating the one or more KPIs further includes:

receiving operation data regarding operations of the entity via the data management platform, aggregating the operation data into a plurality of datasets according to one or more grouping parameters, pre-calculating the one or more KPIs for the entity according to the operation data in one or more datasets of the plurality of datasets, determining whether a specific KPI that is requested corresponds to a pre-calculated predicted KPI, the specific KPI being requested for fulfilling a performance data query that is initiated at a user device or generating a comprehensive performance indicator, retrieving the pre-calculated predicted KPI from a KPI cache for presentation on the user device or generation of the comprehensive performance indicator in response to a determination that the specific KPI corresponds to the pre-calculated predicted KPI, and calculating the specific KPI for the entity according to the operation data in a corresponding dataset of the plurality of datasets, and providing the specific KPI for presentation on the user device or the generation of the comprehensive performance indicator, in response to a determination that the one or more predicted KPIs as pre-calculated fail to correspond to the specific KPI.

15. The computer-implemented method of claim 13, further comprising:

receiving operation data regarding operations of the entity via the data management platform that interfaces with multiple data sources;

aggregating the operation data into a plurality of datasets according to one or more grouping parameters;

calculating multiple KPI trends for the entity according to the operation data in the datasets;

generating at least one alert for one or more KPI trends that indicate at least one performance anomaly of the entity; and providing the at least one alert for the one or more KPI trends that indicate at least one performance anomaly of the entity for display.

16. The computer-implemented method of claim 13, further comprising:

receiving a request to view a KPI trend associated with an alert, the KPI trend indicating a performance anomaly of the entity; and providing the requested KPI trend for presentation on a user device.

17. The computer-implemented method of claim 13, wherein a KPI or a comprehensive performance indicator of the one or more comprehensive performance indicators is to be provided for display by a dashboard application on the user device by filtering according to a specific time period, a specific view, a specific component of the entity, a specific node of the entity, or a specific service of the entity.

18. The computer-implemented method of claim 13, wherein the one or more sources include structured databases that are accessible to data-agnostic data adapters of the data management platform.

19. A system, comprising:

one or more processors; and memory including a plurality of computer-executable components that are executable by the one or more processors to perform a plurality of actions, the plurality of actions comprising:

receiving operation data regarding operations of an entity via a data management platform that interfaces with multiple data sources, the multiple data sources including an operation data source that stores the operation data;

aggregating the operation data into a plurality of datasets according to one or more grouping parameters, the one or more grouping parameters include a specific time period, a specific entity component, a specific user device vendor, a specific user device model, or different levels of an entity hierarchy that includes a subscriber level, a device level, a service area level, and a geographical market level; and selecting one or more predicted Key Performance Indicators (KPIs) for the entity based on historical query request information, the one or more predicted KPIs being likely to be requested in an upcoming time period, pre-calculating the one or more predicated KIPIs for the entity according to the operation data in one or more datasets of the plurality of datasets;

determining whether a specific KPI that is requested corresponds to a pre-calculated predicated KPI;

retrieving the pre-calculated KPI from a KPI cache in response to a determination that the specific KPI corresponds to the pre-calculated predicated KPI; and calculating the specific KPI for the entity according to the operation data in a corresponding dataset of the plurality of datasets in response to a determination that the one or more predicated KPIs as pre-calculated fail to correspond to the specific KPI.

20. The system of claim 19, wherein the plurality of actions further comprises:

receiving one or more additional sources of data regarding the entity via the data management platform that interfaces with the multiple data sources, the multiple data sources further including one or more of a social media data source, an alarm data source of the entity, or a trouble ticket data source of the entity, or a tool data source of the entity;

aggregating the specific KPI and the one or more additional sources of data into datasets according to one or more grouping parameters;

analyzing data in one or more datasets to generate one or more comprehensive performance indicators; and providing at least one comprehensive performance indicator for display on a user device, wherein each KPI and each comprehensive performance indicator respectively indicates a performance of a device, a component, a node, or a service of the entity.

\* \* \* \* \*